United States Patent
Hall et al.

(10) Patent No.: US 7,761,805 B2
(45) Date of Patent: Jul. 20, 2010

(54) DISPLAYING ITEMS USING A REDUCED PRESENTATION

(75) Inventors: Ashley Woodman Hall, Menlo Park, CA (US); Oliver Thomas Bayley, Pacifica, CA (US); Swati Raju, San Jose, CA (US); Andrew Wooldridge, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 167 days.

(21) Appl. No.: 11/519,563

(22) Filed: Sep. 11, 2006

(65) Prior Publication Data

US 2008/0066017 A1 Mar. 13, 2008

(51) Int. Cl.
*G06F 3/048* (2006.01)

(52) U.S. Cl. .................. 715/780; 715/816; 715/864

(58) Field of Classification Search ............... 715/780, 715/816, 708, 711, 864
See application file for complete search history.

(56) References Cited

U.S. PATENT DOCUMENTS

| | | | |
|---|---|---|---|
| 5,913,215 A | 6/1999 | Rubenstein et al. | |
| 6,169,984 B1 | 1/2001 | Bogdan | |
| 6,169,986 B1 | 1/2001 | Bowman et al. | |
| 6,300,947 B1* | 10/2001 | Kanevsky | 715/866 |
| 6,385,602 B1 | 5/2002 | Tso et al. | |
| 6,408,270 B1 | 6/2002 | Garber | |
| 6,587,850 B2 | 7/2003 | Zhai | |
| 6,640,218 B1 | 10/2003 | Golding et al. | |
| 6,697,793 B2 | 2/2004 | McGreevy | |
| 6,947,930 B2 | 9/2005 | Anick et al. | |
| 6,978,264 B2 | 12/2005 | Chandrasekar et al. | |
| 6,985,898 B1 | 1/2006 | Ripley et al. | |
| 7,039,635 B1 | 5/2006 | Morgan et al. | |
| 7,089,237 B2 | 8/2006 | Turnbull et al. | |
| 7,503,001 B1* | 3/2009 | Lekutai | 715/261 |
| 2002/0035574 A1 | 3/2002 | Dumas | |
| 2002/0035673 A1 | 3/2002 | Roseborough et al. | |

(Continued)

FOREIGN PATENT DOCUMENTS

| | | |
|---|---|---|
| DE | 102 35 548 A1 | 3/2002 |
| DE | 102 35 548 A1 | 10/2003 |
| EP | 0530993 A2 | 3/1993 |
| EP | 1 006 704 A2 | 6/2000 |
| EP | 1 031 913 A2 | 8/2000 |
| EP | 1 408 674 A2 | 4/2004 |
| WO | WO 99/66427 | 12/1999 |
| WO | WO 99/66427 A1 | 12/1999 |
| WO | WO 01/80070 A | 10/2001 |
| WO | WO 2004/073286 | 8/2004 |
| WO | WO 2004/073286 A | 8/2004 |
| WO | WO 2004/073286 A2 | 8/2004 |
| WO | WO 2005/098592 | 10/2005 |
| WO | WO 2007/024594 | 3/2007 |

OTHER PUBLICATIONS

Google toolbar, 1 page.

(Continued)

*Primary Examiner*—Thanh T Vu
(74) *Attorney, Agent, or Firm*—Hickman Palermo Truong & Becker LLP

(57) ABSTRACT

To reduce the amount of space needed to display an item, while still retaining meaning for the item, a reduced presentation is determined for the item. The reduced presentation is based on analysis of a portion that contains information that may be less important for the user to see in order to understand the whole item. The item may contain a portion that is based on user input. It is this portion upon which the reduced presentation determination may be made. However, the reduced presentation determination may be based on another factor. For example, the technique is applicable to displaying any list of items that have some common pattern in the items. Based on analysis of the common pattern, a reduced presentation can be determined for at least one of the items.

36 Claims, 5 Drawing Sheets

U.S. PATENT DOCUMENTS

| | | |
|---|---|---|
| 2002/0152204 A1 | 10/2002 | Ortega et al. |
| 2003/0018621 A1 | 1/2003 | Stiner et al. |
| 2003/0061205 A1 | 3/2003 | Cleghorn et al. |
| 2003/0101172 A1 | 5/2003 | De La Huerga |
| 2003/0135490 A1 | 7/2003 | Barrett et al. |
| 2003/0135499 A1 | 7/2003 | Schirmer et al. |
| 2003/0195877 A1 | 10/2003 | Ford et al. |
| 2003/0234821 A1 | 12/2003 | Pugliese |
| 2004/0021691 A1 | 2/2004 | Dostie et al. |
| 2004/0090465 A1 | 5/2004 | Robertson et al. |
| 2004/0153963 A1 | 8/2004 | Simpson et al. |
| 2004/0215654 A1 | 10/2004 | Eberwine et al. |
| 2004/0267730 A1 | 12/2004 | Dumais et al. |
| 2005/0024418 A1 | 2/2005 | Yoshiyama |
| 2005/0099407 A1 | 5/2005 | Pennington et al. |
| 2005/0192944 A1 | 9/2005 | Flinchem |
| 2005/0222981 A1 | 10/2005 | Lawrence et al. |
| 2005/0262059 A1 | 11/2005 | White |
| 2005/0283468 A1* | 12/2005 | Kamvar et al. .................. 707/3 |
| 2005/0288959 A1 | 12/2005 | Eraker et al. |
| 2006/0031747 A1 | 2/2006 | Wada et al. |
| 2006/0064411 A1 | 3/2006 | Gross et al. |
| 2006/0074680 A1 | 4/2006 | Cross et al. |
| 2006/0075120 A1 | 4/2006 | Smit |
| 2006/0173822 A1 | 8/2006 | Watson et al. |
| 2006/0206454 A1* | 9/2006 | Forstall et al. .................. 707/3 |
| 2006/0259479 A1 | 11/2006 | Dai |
| 2006/0287980 A1 | 12/2006 | Liu et al. |
| 2007/0005346 A1 | 1/2007 | Ueda et al. |
| 2007/0022299 A1 | 1/2007 | Yoshimura |
| 2007/0055652 A1 | 3/2007 | Hood et al. |
| 2007/0162422 A1 | 7/2007 | Djabarov |
| 2008/0021721 A1 | 1/2008 | Jones et al. |
| 2008/0077558 A1 | 3/2008 | Lawrence et al. |
| 2008/0109401 A1 | 5/2008 | Sareen et al. |

OTHER PUBLICATIONS

Inquisitor, http://www.inquisitorx.com.beta/, 1 page.
PCT International Search Report and Written Opinion, PCT/US2006/031993, dated May 18, 2007, 10 pages.
PCT International Search Report and Written Opinion, PCT/US2006/032255, dated May 16, 2007, 11 pages.
PCT International Search Report and Written Opinion, PCT/US2006/032243, dated May 16, 2007, 12 pages.
R. Baeza-Yates, et al., "Modern information Retrieval, Chapter 5, Query Operations", Modern Information Retrieval, Harlow: Addison-Wesley, GB, 1999, pp. 117-139, XP0022311981, ISBN: 0-201-39829-X.
International Searching Authority, "Notification of Transmittal of The International Search Report and The Written Opinion of The International Searching Authority, or The Declaration", PCT/US2006/047543, dated May 30, 2007, 12 pages.
Claims, PCT/US2006/047543, 3 pages.
Yates, R et al., "Query Operations", XP-002311981, Chapter 5, 1999, pp. 117-139.
"Communication Pursuant to Article 94(3) EPC" received in European case 06801807.6 dated Jun. 6, 2008, 3 pages.
"Communication pursuant to Article 94(3) EPC" received in Application No. 06 801 807.6-2201 dated Mar. 26, 2009 (7 pages).
Current Claims of 06 801 807.6-2201 dated May 9, 2008 (3 pages).
Clarke, C. et al., "Relevance ranking for one to three term queries" Information Processing and Management 36 (2000) pp. 291-311.
Scholer, F. et al., "Relevance Thresholds in System Evaluations" SIGIR'08 (Jul. 20-24, 2008) pp. 693-694.

* cited by examiner

400

Receive a list of items to be displayed on a display screen   402

Determining that a first item to be displayed on a display screen cannot be displayed within a target region of a display screen if the first item is displayed using a first presentation having a first format   404

Determining a pattern of characters that is common between the first item and a second item   406

Determine a reduced display presentation is determined for the first item such that the first item is able to fit within the target region   408

Display the first item in the target region and at least one other item with the common pattern   410

Fig. 4

DISPLAYING ITEMS USING A REDUCED PRESENTATION

FIELD OF THE INVENTION

The present invention relates to electronic device displays, and in particular, to determining a reduced presentation for an item and displaying the item in a target region having a limited space.

BACKGROUND OF THE INVENTION

Often the amount of space that is available to display information on a display screen of an electronic device is less than needed to display all of the information at a desired resolution (e.g., font size). As an example, when displaying information on a personal digital assistant or cellular telephone, the small screen size constrains the ability to fully display all of the desired information. Electronic devices with larger display screens, such as laptops and personal computers also suffer from this problem. For example, frequently only a portion (e.g., a window or the like) of the display screen is available for displaying a particular type of data.

Typically, when faced with displaying an item that does not fit within an allocated display region, one or more characters are truncated from the end of item with ellipses shown at the end of the item to indicate that the item has been truncated. Determining which characters to remove is simple with this technique.

However, removing information from the end of the item in this arbitrary manner can result in the item being undecipherable to a user. For example, the end of the item may contain information that the user needs to understand the item. However, determining what characters to remove from the item, while still leaving characters that are useful to understand the item, is a difficult problem.

Thus, a need exists for improved ways of determining how to present an item in a limited region of a display of an electronic device such that the item is readily understandable to a user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 depicts a flowchart illustrating steps of a process of displaying items on a display screen of an electronic device using a reduced presentation based on a common pattern, in accordance with an embodiment of the present invention

DETAILED DESCRIPTION OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In order to reduce the amount of space needed to display an item, while still retaining meaning for the item, a reduced presentation is determined for the item. The reduced presentation is based on analysis of a portion of the item that contains information that may be less important for the user to see in order to understand the whole item or at least to know whether the item relates to something of interest. The portion of the item upon which the reduced presentation determination is made is based on user input, in one embodiment.

For example, the user might input some terms, such as a partially formed search query. In response to receiving the partially formed search query, a number of potential completions to the search query can be determined. The potential completions have a portion based on the user input ("user input portion") and some extension to the user input portion. For example, if the user enters the partially formed search query "Monterey bay a", a suggested completion for the partially formed search query might be "Monterey bay aquarium". In this example, a candidate portion for reduction could be "Monterey bay" because the user already knows that information.

Based on analysis of the user input portion, a determination is made if a reduced presentation can be determined for the item. In this case, "Monterey bay aquarium" might be shortened to "Mon . . . bay aquarium" or some other shortened form. Because the user already knows the information that has been extracted, the meaning of the shortened item is readily discernable to the user.

This technique is applicable to cases other than a user entering some input. For example, the technique is applicable to displaying any list of items that have some common pattern in the items. Based on analysis of the common pattern, a reduced presentation can be determined for at least one of the items. If a full version of the common pattern is presented to the user in some manner, the user can readily discern what is missing from the reduced item(s).

Example Environment

Figure 1:
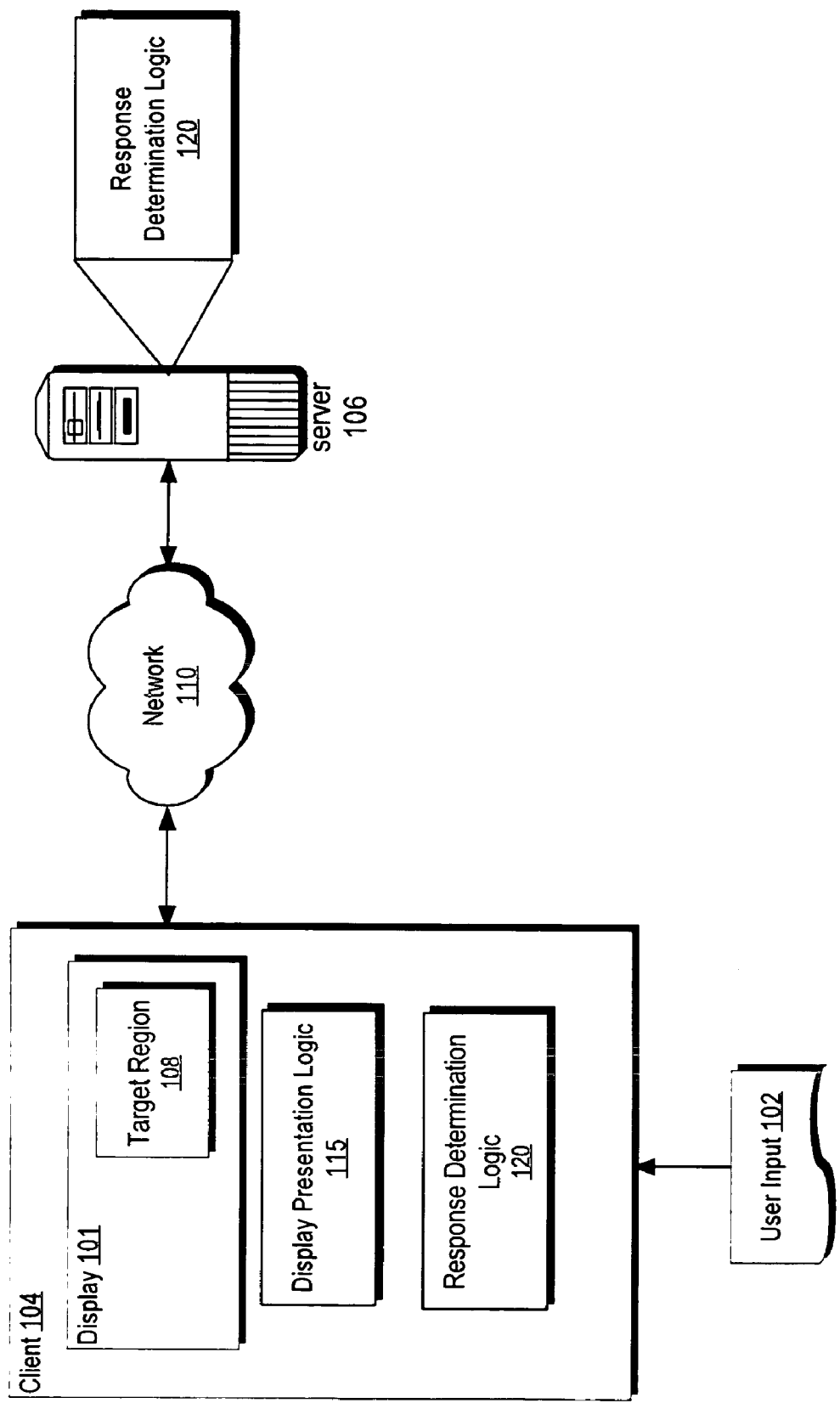
FIG. 1 depicts an example environment, in which an embodiment of the present invention may be practiced.

FIG. 1 depicts an example environment 100, in which an embodiment of the present invention may be practiced. The client 104 has a display screen 101 with a target display region 108. The client 104 could be any electronic device including, but not limited to, a personal computer, personal digital assistant, or cellular telephone.

The target region 108 is for displaying one or more items, which are based on user input 102, in one embodiment. The client 104 sends the user input over the network 110 to the server 106, which determines one or more appropriate responses to the user input 102, in accordance with one embodiment. The server 106 is a search engine in one embodiment. However, it is not required that the server 106 determine the responses. Thus, the client 104 has response determination logic 120 thereon for determining a response to the user input 102, in one embodiment.

The display presentation logic 115 determines whether or not all of the characters of a particular item (e.g., response) will fit within the target region 108. If the particular item will not fit, the display presentation logic 115 determines a reduced presentation in which to display the particular item such that it will fit within the target region 108. The display presentation logic 115 bases this determination by analyzing a portion of the particular item that is based on the user input 102, in one embodiment. The display presentation logic 115 bases this determination by analyzing a common pattern between the particular item and at least one other item to be displayed somewhere on the display 101, in one embodiment. The reduced presentation can be achieved by removing one or more characters from the particular item or by determining a reduced format for at least one character of the particular item. A reduced format can be achieved by using a different font, font size, character spacing, etc.

Determining a Reduced Presentation for an Item Based on User Input

In the following embodiment, a user input portion of the particular item is based, at least in part, on user input. Because the user knows what information was entered, the user is aware of the information in the user input portion regardless of whether it is displayed on the display screen. Therefore, the item can be displayed with information that user knows at least partially removed, while still retaining meaning for the user.

Figure 2:
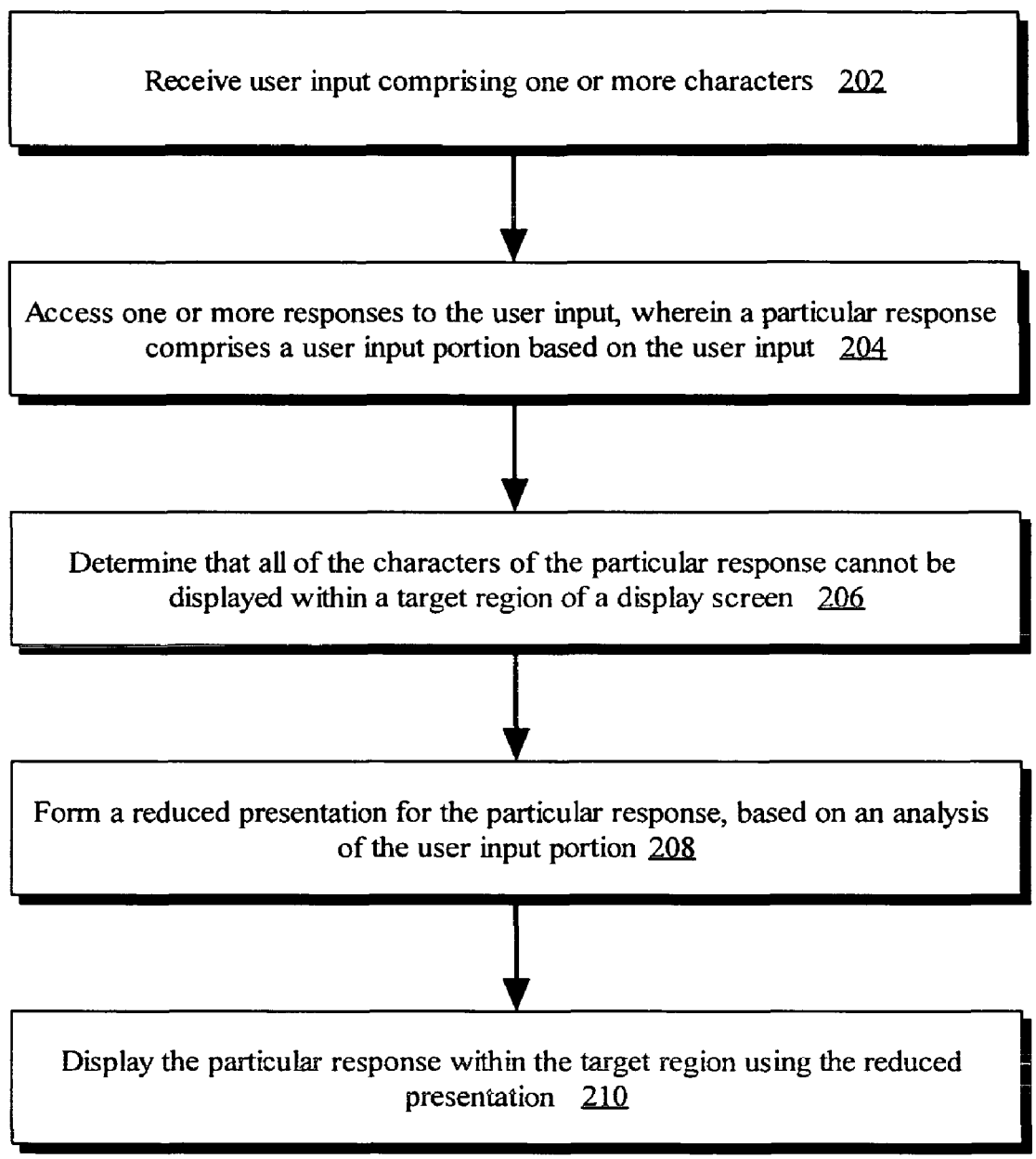
FIG. 2 depicts a flowchart illustrating steps of a process of displaying items on a display screen of an electronic device, in accordance with an embodiment of the present invention.

FIG. 2 depicts a flowchart illustrating steps of a process 200 of displaying items on a display screen of an electronic device using a reduced presentation based, at least in part, on user input, in accordance with an embodiment of the present invention. In step 202, user input is received by a process executing on a client. As an example, the user input might be a partially formed search query that the user enters into a web browser on the client. Continuing with this example, the web browser on the client forwards the partially formed search query to a server, which determines one or more potential completions to the search query. The user input could also be a search for files or other information on the client. Thus, the user input does not have to be entered into a web browser or the like. Moreover, the user input does not need to be a search.

In step 204, one or more responses to the user input are accessed. Continuing with the partially formed search query example, the client receives the potential completions for the partially formed search query from the server. However, if the user input is not a search query, the responses are determined otherwise. For example, if the user input is a search for files on the client itself, the response might be a list of files stored on the client. At least some of the responses comprise a user input portion and an extension, in this embodiment. For example, if the user input is the partially formed search query "Monterey bay a", the responses might include items such as "Monterey bay aquarium ca", "Monterey bay aquarium tickets", "Monterey bay aquarium discount tickets", etc. In this example, the user input portion is an exact match of the user input; however, this is not required. For example, the response might be an alternative search query, such as an alternative spelling suggestion. In this case, the user input portion would be different from the user input.

In step 206, a determination is made that all of the characters of a particular response cannot be displayed within a target region of a display screen if the particular response is displayed using a particular format. Examples of elements of a particular format are font type, font size, character spacing, font style (e.g., bolded, italics), font effects (e.g., shadow, outline, small caps). However, the particular format is not limited to these elements.

In step 208, the client forms a reduced presentation for the particular response, based on an analysis of the user input portion. The reduced presentation is achieved by removing at least one character of the particular response, in one embodiment. An attempt is made to first remove characters from the user input portion, in one embodiment. Continuing with the search query example, the reduced response for "Monterey bay aquarium discount" could be "Mon . . . bay aquarium discount" Characters might also be removed from other than the user input portion. For example, the reduced presentation for the response "Monterey bay aquarium Monterey" could be "Mon . . . bay aquarium Monter . . . " Details of how the reduced presentation is generated, based on an analysis of the user input portion, are described in process 300 of FIG. 3, in accordance with one embodiment of the present invention. The client determines the reduced presentation by determining a reduced display format for at least one character of the particular response, in one embodiment.

In step 210, the particular response is displayed within the target region using the reduced presentation. If the user selects the particular response, the entire response is displayed, in one embodiment. Characters in what remains of the user input portion of the particular response can be displayed using a different color, underscoring, font style, or font effect from the other characters.

Determining a Reduced Presentation for a Particular Item

Figure 3:
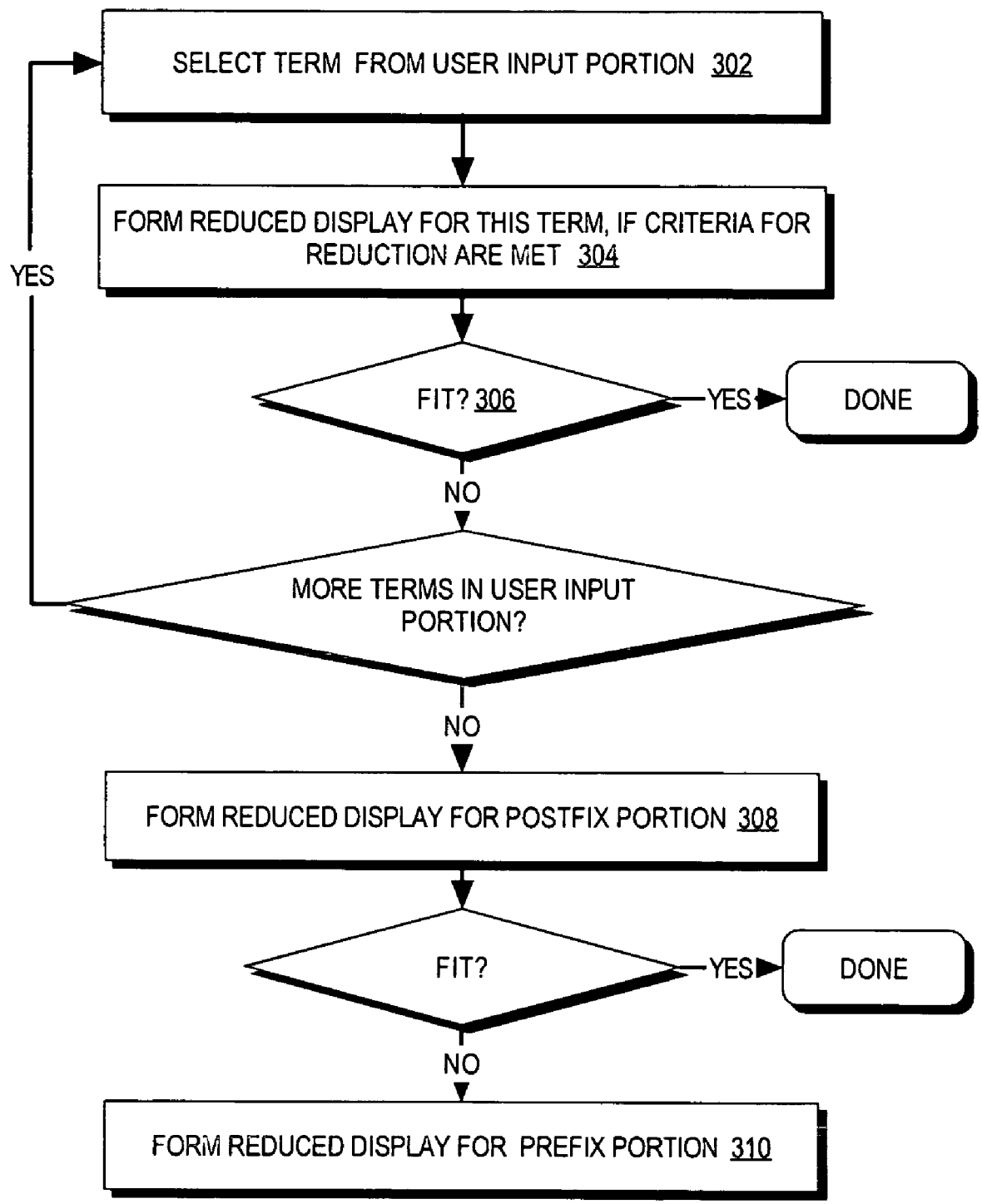
FIG. 3 depicts a flowchart illustrating steps of a process of determining a reduced presentation for a particular item, in accordance with an embodiment of the present invention.

Process 300 of FIG. 3 describes determining a reduced presentation for a particular item, in accordance with an embodiment of the present invention. In process 300, the particular response has a user input portion and at least one of a prefix portion and a postfix portion. The prefix and postfix are collectively referred to herein as an extension to the user input portion. For example, the particular response to user input of "arizona footb" could be "university of arizona football schedule." In this example, the prefix portion is "university of" and the postfix portion is "all schedule."

The user input portion may include a number of terms, such as words. However, some terms in the user input portion are not complete words or even portions of words. For example, a term might be a number such as "401" or a combination of numbers, letters and other characters such as "401(k)". In step 302, a term from the user input portion is selected as a candidate for reduced presentation. In the present example, the term "arizona" is selected as a candidate for reduced presentation.

In step 304, a reduced presentation is formed for the term, if reduction criteria are met. In process 300, the reduced presentation is achieved by removing one or more characters from the item. The removal is truncating one or more characters from the end of the term, in one embodiment. Characters are only removed if the term is a complete word, in accordance with one embodiment. Characters are only removed if the term has at least a certain number of characters, in one embodiment. For example, words that have less than five characters are not truncated, in one embodiment. At least a certain number of characters are kept in the term, in one embodiment. For example, at least three characters are kept in the term. In the present example, the term "arizona" in the user input portion might be truncated to "ari . . . " with the ellipses being optional.

In step 306, a determination is made as to whether the item will fit within the target region after character removal from the term. If the item will fit, process 300 ends. Otherwise, another term is selected from the user input portion as a candidate for reduction, if there is another term in the user input portion.

If all of the terms of the user input portion are processed and the item still does not fit in the target region, a reduced presentation is determined for the postfix portion to attempt to fit the item in the target region, in step 308. Characters are removed from the end of the postfix portion so long as there are at least a certain number of characters left in the postfix portion, in one embodiment. For example, so long as there are at least five characters left in the postfix portion one character is removed from the end until the item fits in the target region. Thus, in the present example, if needed one or more characters might be truncated from "all schedule".

If the item still does not fit in the target region after processing the input portion and the postfix portion, then the prefix portion is reduced, in step 310. Reducing the prefix portion can be performed in a similar way that the postfix portion was reduced. Thus, in the present example, if needed one or more characters might be truncated from "university of". As a particular example, the truncation might be "univers . . .".

If after reducing the three portions, the item still does not fit in the target region, then additional characters can be first removed form the postfix region and then the prefix region until the item will fit in the target region.

Variation of process 300 can be performed, such as processing the prefix portion prior to processing the postfix portion. Moreover, not all items will have both a postfix portion and a prefix portion. Extensions of process 300 can also be performed. For example, if the response does not contain a user input portion, then truncation can take place at the end of the response. For example, the response to "abba" might be "agnetha benny bjom annifrid", in which case the end can be truncated if needed.

Determining a Reduced Display Format for a Character Rather than Eliminating the Character Rather than eliminating a character in a term, one or more characters in the term can be altered in some way to reduce the amount of display that is required. As examples, the font can be changed to take up less space, while still displaying all characters. Specific examples of this technique are to reduce the space between characters, reduce the font size, select a font that uses less space than the original font. Up to all of the characters in a given term can be altered. For example, for the response "Monterey bay aquarium discount", all of the whole words in the user input portion "Monterey bay" might be displayed with character spacing that is narrow. However, the term does not need to be a complete word for its display to be altered.

Process Flow in Accordance with an Embodiment Based on a Common Pattern

FIG. 4 depicts a flowchart illustrating steps of a process 400 of displaying items on a display screen of an electronic device using a reduced presentation based on a common pattern, in accordance with an embodiment of the present invention. In step 402, a list of items to be displayed on a display screen is received. The list might be suggested completions to a partially formed search query entered by a user. The list might also be alternative search queries to a user entered search query. In these examples, the content of the items in the lists is related to the content of the user input. However, it is not required that the user enter a search query or even any terms or the like. For example, the list could be file names, which might be displayed in response to a user request for a list of files. As a particular example, the list might contain names for different fonts, such as follows.

Lucida Sans Typewriter Bold

Lucida Sans Typewriter Bold Oblique

Lucida Sans Typewriter Oblique

Lucida Sans Typewriter Regular

Lucida Sans Typewriter Unicode

A target region of the display is also received, in step 402. In the example of displaying file names, the target region might be a portion of a window. For example, file names are often times displayed in a window along with other information such as dates and file locations. Often the window is divided into a separate region to display each of these types of information.

In step 404, a determination is made as to whether a particular item to be displayed cannot be displayed within the target region if the item is displayed using a first format. In the example of font names, "Lucida Sans Typewriter Bold Oblique" might be too long to fit within the target region.

In step 406 a pattern of characters that is common between the first item and another item is identified. For example, if the list of items comprises the following files for different font types, the common pattern might be "Lucida Sans Typewriter".

In step 408, a reduced presentation is determined for the first item such that the first item is able to fit within the target region. The determination is based on the common pattern. Basing the determination on the common pattern allows the first item to be displayed in the target region with its meaning being readily discernable to the user. Moreover, the user is able to easily distinguish between different items on the list. In the present example, the item "Lucida Sans Typewriter Bold Oblique" might be shortened to "Luc . . . Sans Typ . . . Bold Oblique". A technique that is similar to the one described in process 300 of FIG. 3 can be used to determine the reduced presentation by basing the determination on the common pattern instead of a user input portion.

In step 410, the first item is displayed in the target region. Other items may also be displayed at the same time. As the following example shows, the meaning of each item is clearly discernable and distinguishable from each other item. The user is able to infer what the shortened item means from a quick glance at one or more of the other items. Note that if the item that did not fit into the target region was shortened by truncating characters at the end, then information would have been lost making it impossible for the user to discern the full meaning of the shortened item or distinguish its meaning from the other items.

Lucida Sans Typewriter Bold

Luc . . . Sans Typ . . . Bold Oblique

Lucida Sans Typewriter Oblique

Lucida Sans Typewriter Regular

Lucida Sans Typewriter Unicode

As discussed herein, the reduced presentation for the item could also be based on determining a reduced display format for at least one character of the first item.

Displaying an Item Using Reduced Presentation without Simultaneously Displaying User Input or Common Pattern The item that is displayed with the reduced presentation does not have to be displayed simultaneously with the user input. For example, the user input might be initially displayed, but when the response is displayed the user input is no longer displayed. Moreover, there is no requirement that the user input ever be displayed. For example, the user will still know what is input even if it is not displayed back to the user.

Furthermore, the item that is displayed with the reduced presentation does not have to be displayed simultaneously with the other item(s) having the common pattern. For example, the user input might be a search for hotels, a request to display a map of a location, or some combination of these. An interactive map can be displayed to the user, wherein the user can select a point on the map to reveal information related to that location. As a particular example, the user might select a city on the map to reveal a street address or addresses of hotel(s) in that city for a particular chain of hotels. The hotel address(es) may be displayed in a pop up region, which is the target display region. The user can then move the cursor to a different location, wherein the process repeats.

In this case, the user input (e.g., search query) might be displayed along with an item have a reduced presentation in a pop up region. However, it is also possible that the information displayed in successive pop up regions comprises a common pattern. For example, the response in each pop up window might comprise the same city and state. Since the user knows the information that was displayed in the first pop up region, the common pattern in the second pop up region is a candidate for a reduced presentation.

Hardware Overview

Figure 5:
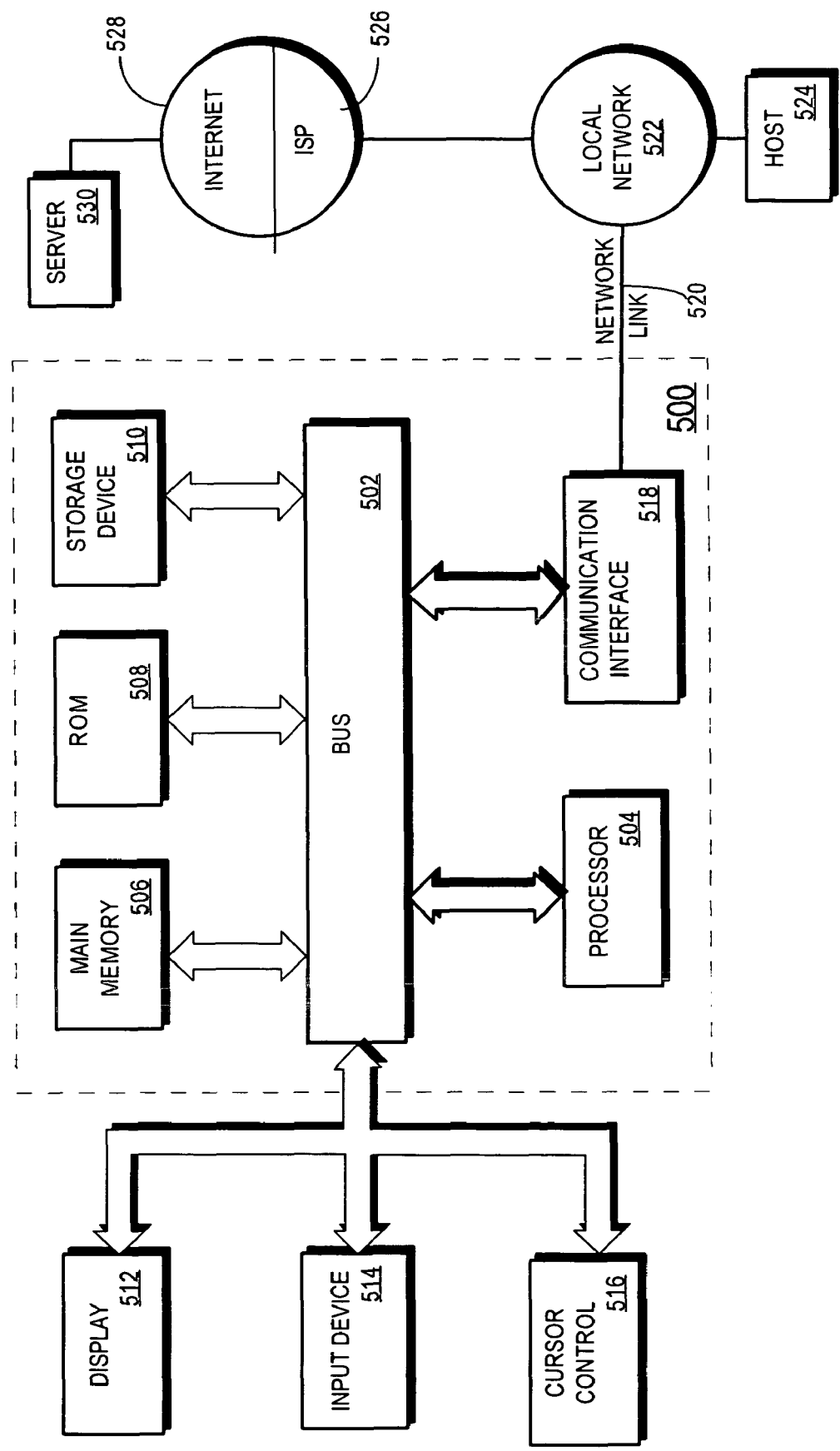
FIG. 5 is a block diagram that illustrates a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may be used to implement the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising performing a machine-executed operation involving instructions which, when executed by one or more processors, cause the one or more processors to perform the steps of:
   receiving, through an interface of a device, user input comprising one or more characters;
   accessing one or more responses to the user input, wherein each of the one or more responses comprises a user input portion that is based on the user input, wherein accessing one or more responses to the user input comprises:
      accessing one or more potential completions for the user input, wherein each potential completion comprises the user input portion and an extension, wherein the extension specifies a remainder of the potential completion for the user input;
   determining, based on display capabilities of the device, that all of the characters of a particular response cannot be displayed within a target region of a display screen of the device if the characters in the particular response are displayed using a particular format;
   based, at least in part, on analysis of the user input portion of the particular response, forming a reduced presentation for the user input portion of the particular response by performing at least one of the following steps:
      (a) removing at least one character of the user input portion of the particular response; or
      (b) determining a reduced display format for at least one character of the user input portion of the particular response, wherein the reduced display format uses less of the target region to display characters than the particular format;
   using the reduced presentation, displaying the particular response within the target region; and
   wherein the machine-executed operation is at least one of i) sending said instructions; ii) receiving said instructions; iii) storing said instructions; or iv) executing said instructions.

2. The method of claim 1, wherein the user input comprises a search query.

3. The method of claim 2, wherein the search query is a partially formed search query.

4. The method of claim 3, wherein the one or more potential completions are suggested completions to the partially formed search query.

5. The method of claim 1, wherein the step of forming a reduced presentation further comprises:
   in response to a determination, that after removing one or more characters from the user input portion, the potential completion will not fit within the target region, removing at least one character of the extension of the potential completion.

6. The method of claim 1, wherein the extension comprises a prefix portion that is prior to the user input portion and a postfix portion that is after the user input portion; and wherein forming the reduced presentation for the particular response further comprises:
   removing one or more characters from selected terms of the postfix portion from the potential completion to attempt to form a version of the potential completion that fits in the target region; and
   if removal of one or more characters from selected terms of the postfix portion does not result in a version of the potential completion that fits in the target region, removing at least one character of the prefix portion of the potential completion.

7. The method of claim 1, wherein the instructions further comprise instructions for:
   receiving a particular potential completion for the user input that is based on one or more terms in the user input but does not include the one or more terms in the user input; and
   in response to a determination that the particular potential completion will not fit into the target region, removing one or more characters from the end of the particular potential completion in order to form a version of the particular potential completion that will fit into the target region.

8. The method of claim 1, wherein forming a reduced presentation for the particular response comprises removing at least one character of the particular response.

9. The method of claim 8, wherein the user input portion comprises a plurality of terms, and wherein the step of removing at least one character of the particular response comprises removing one or more characters from the end of a particular term.

10. The method of claim 9, wherein removing one or more characters from the end of the particular term comprises allowing at least a certain number of characters to remain in the particular term.

11. The method of claim 9, wherein the instructions further comprise instructions for only removing a character from a term in the user input portion if the term comprises at least a certain number of characters.

12. The method of claim 9, wherein the instructions further comprise instructions for only removing a character from a term in the user input portion if the term forms a complete word.

13. The method of claim 8, wherein the instructions further comprise instructions for:
   in response to user selection of the reduced presentation for the particular response, displaying the particular response with all characters displayed.

14. The method of claim 8, wherein the step of forming a reduced presentation of the particular response includes removing one or more characters from the user input portion of the particular response.

15. The method of claim 14, wherein:
   the user input portion comprises a plurality of terms; and
   said one or more characters do not include a) the first character of the first term; nor b) the last character of the last term.

16. The method of claim 1, wherein:
   forming a reduced presentation for the particular response comprises determining a reduced display format for at least one character of the particular response; and
   the reduced display format uses less of the target region to display characters than the particular format.

17. The method of claim 16, wherein determining a reduced format for at least one character of the first item comprises determining at least one of the following for at least one character that will allow the first item to be displayed in the target region:
   a font size;
   a font type;
   a character spacing;
   a font style; and
   a font effect.

18. The method of claim 1, wherein the instructions further comprise instructions for displaying the user input on the display screen at the same time as the reduced presentation for the particular response.

19. The method of claim 1, wherein the steps of determining and forming a reduced presentation of the particular response are performed by the device.

20. The method of claim 1, wherein:
   the step of forming a reduced response includes removing one or more characters from the user input portion of the particular response; and the instructions further comprise instructions for performing:
      determining that removing one or more characters from the user input portion of the particular response does not result in a version of the response that fits in the target region; and
      in response to determining that removing one or more characters from the user input portion of the particular response does not result in a version of the response that fits in the target region, removing at least one character of the portion of the response that is not the user input portion of the response.

21. The method of claim 1,
   wherein the step of removing at least one character causes at least one word, in the response, to be truncated by causing the word to be displayed with at least one character and fewer than the total number of characters in the word.

22. A method comprising performing a machine-executed operation involving instructions which, when executed by one or more processors, cause the one or more processors to perform the steps of:
   determining that all of the characters of a first item to be displayed on a display screen of a device cannot be displayed within a target region of the display screen if the first item is displayed using a first format;
   determining a pattern of characters that is common between the first item and a second item, wherein the second item is one of:
      an item to be displayed on the display screen with the first item; or
      an item that has been displayed on the display screen;
   based, at least in part, on analysis of the common pattern, forming a reduced presentation for the first item by performing at least one of the following steps:
      (a) removing at least one character of the portion of the first item having a common pattern with the second item; or
      (b) determining a reduced display format for at least one character of the portion of the first item having a common pattern with the second item; and
   using the reduced presentation, displaying the first item within the target region;
   wherein said first item and said second item are both responses to user input received through an interface of the device;
   wherein the first item comprises a potential completion for the user input, wherein each potential completion comprises the user input portion and an extension, wherein the extension specifies a remainder of the potential completion for the user input; and
   wherein the machine-executed operation is at least one of i) sending said instructions;
      ii) receiving said instructions; iii) storing said instructions; or iv) executing said instructions.

23. The method of claim 22, wherein forming a reduced presentation for the first item comprises removing at least one character of the first item.

24. The method as recited in claim 23, wherein the common portion comprises a plurality of terms, and wherein the step of removing at least one character from the first item to form the reduced presentation comprises removing one or more characters from the end of at least one of the terms.

25. The method of claim 24, wherein removing one or more characters from the end of at least one of the terms comprises allowing at least a certain number of characters to remain.

26. The method of claim 24, wherein the instructions further comprise instructions for only removing a character from a term if the term comprises at least a certain number of characters.

27. The method of claim 24, wherein the instructions further comprise instructions for only removing a character from a term if the term forms a complete word.

28. The method of claim 23, wherein the instructions further comprise instructions for performing:
   in response to user selection of the reduced presentation for the first item, displaying the first item with all characters displayed.

29. The method of claim 22, wherein forming a reduced presentation for the first item comprises determining a reduced display format for at least one character of the first item.

30. The method of claim 29, wherein determining a reduced format for at least one character of the first item comprises determining at least one the following for at least one character that will allow the first item to be displayed in the target region:
- a font size;
- a font type;
- a character spacing;
- a font style; and
- a font effect.

31. The method of claim 22, wherein the instructions further comprise instructions for displaying the second item on the display screen at the same time as reduced presentation for the first item.

32. The method of claim 22, wherein the instructions further comprise instructions for displaying the second item on the display screen prior to displaying the reduced presentation for the first item, wherein the first item and second item are not displayed at the same time.

33. The method of claim 22, wherein the step of displaying the first item within the target region comprises displaying all of the common pattern of the first item in a different format than the other portions of the first item.

34. The method of claim 33, wherein the different format comprises a different color.

35. The method of claim 33, wherein the different format comprises a different font style.

36. The method of claim 33, wherein the different format comprises a different font effect.

* * * * *